United States Patent [19]

Koike et al.

[11] 3,978,654
[45] Sept. 7, 1976

[54] MOTION TRANSFORMER

[75] Inventors: Kenichi Koike; Yoshikazu Kawamura, both of Shimosuwa, Japan

[73] Assignee: Kabushiki Kaisha Suwa Seikosha, Tokyo, Japan

[22] Filed: Nov. 24, 1975

[21] Appl. No.: 634,803

Related U.S. Application Data

[62] Division of Ser. No. 477,239, June 7, 1974.

[30] Foreign Application Priority Data

June 7, 1973   Japan.................. 48-64079

[52] U.S. Cl. .................... 58/23 D; 58/1 M; 310/37
[51] Int. Cl.² .......................... G04C 3/00
[58] Field of Search .............. 58/1 M, 23 D, 26 A, 58/140 A; 310/37, 38; 74/25

[56] References Cited
UNITED STATES PATENTS 3,652,884   3/1972   Vuffray................ 58/23 D
3,783,600   1/1974   Ganter et al................ 58/23 D Primary Examiner—Joseph F. Peters, Jr.
Assistant Examiner—Vit W. Miska
Attorney, Agent, or Firm—Blum, Moscovitz, Friedman & Kaplan

[57] ABSTRACT

A rotary motion transformer particularly adapted to provide continuous rotary motion to a driven member in response to an intermittently rotated driving member is provided. The driven member and the driving member are oppositely poled magnetic permeable members disposed proximate to each other to provide a flux field therebetween. The driven rotary member is disposed in a viscous damping reservoir, the viscous damping reservoir effecting smooth and continuous rotation of the driven member.

5 Claims, 2 Drawing Figures

MOTION TRANSFORMER

This is a division of application Ser. No. 477,239, filed June 7, 1974.

BACKGROUND OF THE INVENTION

This invention is directed to a rotary motion transformer for effecting a continuous rotation of a rotary member in response to intermittent rotational driving thereof, and in particular to a rotary motion transformer for use in an electronic wristwatch wherein the intermittent rotary motion of the gear train is transformed into continuous rotary motion of the watch hands.

Heretofore motion transformers for converting the reciprocating motion of a stepping motor into a rotational motion have been utilized in electronic wristwatches. A particular disadvantage of such motion transformers is that the stepping motor causes the rotor to be intermittently rotated due to the manner in which excitation signals are applied to the step motor, i.e., the number of rotations of the rotor is determined by the number of pulses per unit of time. Accordingly, a step motor utilized to transform the electrical signal applied into a rotational signal causes the mechanical rotary motion to reflect the application of the electrical signals applied thereto. This is particularly the case when only a few signals per unit of time are applied thereto. The intermittent rotary motion of the rotor is transmitted to the gear train mechanism of the wristwatch, and the gear train is intermittently rotated whether the speed of the gear train movement is increased or reduced. This intermittent rotation of the gear train is clearly perceived by the user of a quartz crystal wristwatch when for example, the second hand is intermittently rotated in a quartz crystal timepiece. Accordingly, it is desirable to provide a smooth, continuous rotation of the clock hands in response to the intermittently rotated gear train.

SUMMARY OF THE INVENTION

Generally speaking, in accordance with the invention a rotary motion transformer for providing continuous motion to a rotating member in response to an intermittent rotational driving thereof is provided. The rotary motion transformer includes a magnetic permeable rotatable driving member having two opposite polarity poles and a magnetic permeable rotatable driven member having two opposite polarity poles, the driven member and driving member being disposed to define a flux field therebetween. The driven member is rotatably disposed in a viscous damping reservoir, the damping reservoir causing the driven member to be continuously rotated in response to the intermittent rotation of the driving member.

Accordingly, it is an object of this invention to provide an improved rotary motion transformer wherein the intermittent rotational motion of a rotating member is transformed into a smooth continuous rotation.

Still another object of this invention is to provide an improved rotary motion transformer wherein a viscous damping device is utilized to continuously rotate a driven member in response to an intermittently rotated driving member.

It is still another object of this invention to provide a simple, highly reliable and extremely efficient motion transformer for effecting a smooth continuous rotation of a rotating member.

Still another object of this invention is to provide an improved rotary motion transformer particularly suited for providing a continuous rotation to the second hand of an electronic wristwatch in response to the intermittent rotation of the gear train thereof.

Still other objects and advantages of the invention will in part by obvious and will in part be apparent from the specification.

The invention accordingly comprises the features of construction, combination of elements and arrangement of parts which will be exemplified in the construction hereinafter set forth, and the scope of the invention will be indicated in the claims.

For a fuller understanding of the invention, reference is had to the following description taken in connection with the accompanying drawing, in which:

FIG. 1 is an elevated partially sectioned view of a rotary motion transformer constructed in accordance with the instant invention; and FIG. 2 is an elevated sectioned view of an electronic timepiece utilizing the rotary motion transformer of the instant invention.

DETAILED DESCRIPTION OF THE PREFERRED EMBODIMENTS

Figure 1:
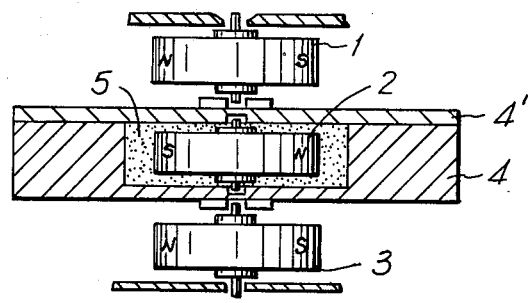

Reference is now made to FIG. 1, wherein a rotary motion transformer constructed in accordance with the instant invention is depicted. Rotary driving wheel 1, driven wheel 2 and following wheel 3 are formed of permanent magnets magnetized into two opposite polarity poles and are independently mounted by separate bearings to rotate about the same axis. The driven wheel 2 is sealed in a vessel 4 covered by a cover 4', the vessel defining a reservoir containing a highly viscous material 5.

In operation, if driving wheel 1 is intermittently rotated, magnetic driven wheel 2 will be simultaneously rotated by the attractive flux field caused by the alignment of the opposite poles of the two rotary members. However, because the magnetic driven wheel 2 is disposed in viscous material reservoir 5, the resistance of the viscous material dampens the intermittent rotary forces applied to the driven member to continuously rotate same. Thus, if driving wheel 1 is rotated through an angle of 5° for each second, the driven wheel 2 would not instantaneously be rotated therewith, but instead would be continuously and slowly rotated through the angle 5° by the attractive forces between the driving wheel permanent magnet and driven wheel permanent magnet. Accordingly, the driving wheel 1 is rotated at uniform intervals of time through a uniform angle, the motion of the magnetic driven wheel 2 thereby becoming smooth and continuous and the slight time retardation caused by the viscous damping material being hardly noticeable.

Permanent magnet following wheel 3 is therefore continuously rotated by the attractive forces between the opposite polarity poles of the driven wheel and the following wheel. Accordingly, in reponse to the intermittent rotary motion of driving wheel 1, following wheel 3 is adapted to transmit continuous smooth rotation to a shaft.

It is noted that although following wheel 3 is illustrated in FIG. 1 as being independently rotatable with respect to the driven wheel 2, a nonmagnetic following member can be mounted to driven wheel 2 to to be rotated thereby. Further, although all three magnetic permeable wheels are permanent magnets, it is noted that any high permeability materials are contemplated for use in the instant invention.

Figure 2:
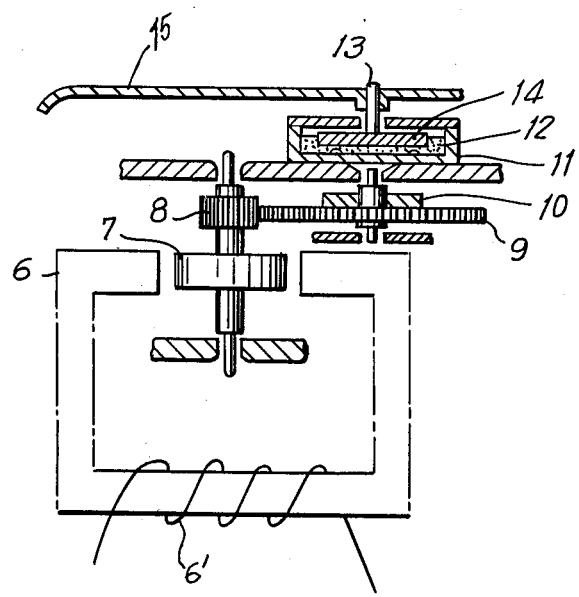

Reference is now made to FIG. 2, wherein the use of a rotary motion transformer in an electronic wristwatch having a step motor is depicted. The step motor includes a stator 6 adapted to effect a rotary motion of rotor 7 in response to the electrical signals applied to a coil 6'. Accordingly, the motion of the rotor 7 is responsive to either the alternating polarity pulses, or the on and off switching of the signals applied to the stator coil 6'. The rotor 7 has a rotor pinion 8 mounted on the same shaft thereof, the rotation of the rotor thereby being transmitted to a speed reduction gear 9 by the rotor pinion 8. If, for example, a one second signal is applied to the stator, the rotor is intermittently rotated one second, thereby effecting an intermittent rotation of speed reduction gear 9, the angle through which the gears are rotated being depended upon the number of magnetic poles provided on the rotor. If, for example, the rate of rotation of the speed reduction gear 9 is set at one complete revolution per minute, and the rotation of the shaft of the speed reduction gear 9 utilized to rotate a second hand for a timepiece, the intermittent rotary motion of the second hand is one second per step.

In accordance with the invention, an oppositely poled permanent magnet is mounted to the speed reduction gear 9 to rotate around the same shaft. It is noted that the permanent magnet 10 could also be mounted to the shaft at any position thereof as long as the rotary motion of the speed detection gear 9 is equally transmitted to the permanent magnet 10. An oppositely poled permanent magnet driven member 14 is disposed in a viscous material reservoir 12 contained in vessel 11.

The driven magnetic member 14 has a second hand 15 mounted thereto by second hand shaft 13. Accordingly, in the same manner noted above, intermittent rotation of speed reduction gear 9 effects intermittent rotary motion of the magnetic member 10, which in turn causes driven magnetic member 14 to be continuously rotated through viscous material 12 to thereby effect a continuous rotation of the second hand. The continuous rotation of the second hand is thereby effected without causing any change in the operation of the gear train. Furthermore, any number of speed reduction gears can be utilized in combination with the speed reduction gear 9 without having any harmful effects on the operation of the wristwatch.

It is noted, that the accurate, smooth and continuous rotation of the second hand depends to a large extent on the shape of the permanent magnet, the strength of the magnetic flux fields when gears, magnetic members, etc. are in each position, and the viscosity of the sealed liquid. Accordingly, such a rotary motion transformer is particularly suited for any instrument wherein continuous rotary movement is preferable to intermittant rotary motion.

It is also noted that permanent magnets can take on any shape, such as bars, plates or rings and that all the magnets in each construction are not limited to the same shape, same number of magnetic poles, or direction in which the magnetic poles are magnetized. Moreover, axial alignment of the permanent magnets is not required, the attraction principle in the direction of the diameter of the magnetic wheels being equally applicable.

It will thus be seen that the objects set forth above, among those made apparent from the preceding description are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. In an electronic timepiece having a step motor for intermittently stepping a gear train including a plurality of intermittently driven gears, the improvement comprising a first permanent magnet associated with at least one gear, said permanent magnet being intermittently rotated by said gear associated therewith, and clock hand means including a permanent magnet disposed to define a flux field between said gear associated magnet and said clock hand magnet, and viscous damping means surrounding said clock hand magnet to effect a continuous rotation of said clock hand means in response to the intermittent rotation of said gear train.

2. In an electronic timepiece having a step motor, the improvement comprising step motor means including a rotor and a magnetic permeable rotatable driving member having two opposite polarity poles, said step motor intermittently rotating said magnetic permeable rotatable driving member in response to a stepping of the rotor thereof, and clock hand means including a magnetic permeable rotatable driven member having two opposite polarity poles, said driven member and driving member being positionally disposed to define a flux field therebetween and rotate about the same axis; and a viscous damping means, said driven member portion of said clock hand means being rotatably disposed in said viscous damping means, said driven member and hence said clock hand means being continuously rotated in response to the intermittent rotation of said driving member.

3. An electronic timepiece as claimed in claim 2, wherein said driving member and driven member are permanent magnets.

4. An electronic timepiece as claimed in claim 2, wherein said clock hand means includes a clock hand disposed without said viscous damping means, whereby said clock hand is continuously rotated in response to intermittent rotations of said driven member by said step motor.

5. An electronic timepiece as claimed in claim 3, wherein said viscous damping means includes a vessel defining a viscous material reservoir therein.

* * * * *